(12) United States Patent
Chai

(10) Patent No.: US 12,689,878 B2
(45) Date of Patent: Jul. 21, 2026

(54) SERVICE PROCESSING METHOD AND APPARATUS, COMMUNICATION DEVICE, AND STORAGE MEDIUM

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventor: Li Chai, Beijing (CN)

(73) Assignees: CHINA MOBILE COMMUNICATION CO., LTD RESEARCH INSTITUTE, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 82 days.

(21) Appl. No.: 18/725,364

(22) PCT Filed: Dec. 30, 2022

(86) PCT No.: PCT/CN2022/143855
§ 371 (c)(1),
(2) Date: Jun. 28, 2024

(87) PCT Pub. No.: WO2023/125917
PCT Pub. Date: Jul. 6, 2023

(65) Prior Publication Data
US 2025/0071531 A1 Feb. 27, 2025

(30) Foreign Application Priority Data
Dec. 31, 2021 (CN) .......................... 202111666542.9

(51) Int. Cl.
*H04L 12/24* (2006.01)
*H04L 41/0803* (2022.01)
(Continued)

(52) U.S. Cl.
CPC ............... *H04W 4/70* (2018.02); *H04L 67/60* (2022.05); *H04W 56/001* (2013.01)

(58) Field of Classification Search
CPC . H04W 4/70; H04W 56/001; H04W 72/0446; H04W 56/00; H04W 72/1221; H04L 67/60
(Continued)

(56) References Cited

U.S. PATENT DOCUMENTS 11,317,389 B2 * 4/2022 Liu ........................ H04W 72/51
11,477,849 B2 * 10/2022 Xu ......................... H04W 88/04
(Continued)

FOREIGN PATENT DOCUMENTS

CN 1638360 A 7/2005
CN 109392028 B 6/2021
(Continued)

OTHER PUBLICATIONS

First Office Action of the Japanese application No. 2024-539281, issued on May 27, 2025. 8 pages with English translation.
(Continued)

*Primary Examiner* — Moustafa M Meky
*Assistant Examiner* — Elizabeth Kassa
(74) *Attorney, Agent, or Firm* — Syncoda LLC; Feng Ma

(57) ABSTRACT

A service processing method and apparatus, a communication device, and a storage medium involve: a common function layer of at least two terminals performing collaboration processing on data of at least two services of the at least two terminals according to the association relationship between the data of the at least two services of the at least
(Continued)

A common function layer of at least two terminals performs a collaboration processing on data of at least two services of the at least two terminals, according to at least one of: an association relationship of the data of the at least two services of the at least two terminals, or an association relationship of the at least two services of the at least two terminals ⟶ 11

The data, that has been subjected to the collaboration processing, of the at least two services of the at least two terminals, is transmitted on a radio resource ⟶ 12 two terminals and/or the association relationship between the at least two services of the at least two terminals; and transmitting, on the radio resource, the data of the at least two services of the at least two terminals subjected to collaboration processing.

19 Claims, 6 Drawing Sheets

(51) Int. Cl.
| | | |
|---|---|---|
| *H04L 67/60* | (2022.01) | |
| *H04W 4/70* | (2018.01) | |
| *H04W 56/00* | (2009.01) | |

(58) Field of Classification Search
USPC ........................................................ 709/217
See application file for complete search history.

(56) References Cited

U.S. PATENT DOCUMENTS

| | | | | |
|---|---|---|---|---|
| 2015/0163822 A1* | 6/2015 | Guo | ...................... | H04W 72/12 |
| | | | | 370/329 |
| 2016/0323891 A1* | 11/2016 | Zhang | ................... | H04W 72/23 |
| 2019/0392333 A1* | 12/2019 | Vega | .................... | G05D 1/0289 |
| 2020/0178271 A1* | 6/2020 | Shi | ......................... | H04L 5/0092 |
| 2020/0314690 A1* | 10/2020 | Kim | ....................... | H04W 4/70 |
| 2021/0037601 A1* | 2/2021 | Xu | ......................... | H04W 88/04 |
| 2022/0014967 A1* | 1/2022 | Kim | ........................ | H04L 69/04 |

FOREIGN PATENT DOCUMENTS

| | | | | | | |
|---|---|---|---|---|---|---|
| CN | 113596706 | A | * | 11/2021 | ............ | H04W 48/16 |
| CN | 113596782 | A | * | 11/2021 | ............ | H04W 72/23 |
| CN | 113596782 | A1 | | 11/2021 | | |
| JP | 2020129812 | A | | 8/2020 | | |
| WO | 2014026375 | A1 | | 2/2014 | | |
| WO | 2015010647 | A1 | | 1/2015 | | |
| WO | 2019129198 | A1 | | 7/2019 | | |
| WO | 2021018222 | A1 | | 2/2021 | | |

OTHER PUBLICATIONS

International Search Report in the international application No. PCT/CN2022/143855, mailed on Mar. 15, 2023. 5 pages with English translation.

Written Opinion of the International Search Authority in the international application No. PCT/CN2022/143855, mailed on Mar. 15, 2023. 6 pages with English translation.

Supplementary European Search Report in the European application No. 22915166.7, mailed on Jan. 20, 2025, 10 pages.

SA WG2 Meeting #S2-148E S2-2109360 (revision of S2-2108416r07), Nov. 15-22, 2021, Electronic meeting, Source: China Mobile, Huawei, Hisilicon, Tencent, Xiaomi, Title: New SID on Study on architecture enhancement for XR and media services, Document for: Approval, Agenda Item: 9.1.5.

Chen Yang, Chen Hao, Zhao Wen, Jiang Peng-bo, "VoLTE Voice Security Communication Scheme for Mobile Terminals", Communications Technology, vol. 52 No. 4, Apr. 2019.

3GPP TSG-RAN WG2 Meeting #96 R2-168688, Reno, USA, Nov. 14-18, 2016, Agenda item: 9.2.1.2, Source: Nokia, Alcatel-Lucent Shanghai Bell, Title: Analysis of possible solutions for supporting URLLC requirements, WID/SID: FS_NR_newRAT—Release 14, Document for: Discussion and Decision.

* cited by examiner

SERVICE PROCESSING METHOD AND APPARATUS, COMMUNICATION DEVICE, AND STORAGE MEDIUM

CROSS-REFERENCE TO RELATED APPLICATION

This is a national stage of International Application No. PCT/CN2022/143855 filed on Dec. 30, 2022, which claims priority to Chinese patent application No. 202111666542.9 filed on Dec. 31, 2021. The disclosures of the above-referenced applications are hereby incorporated by reference in their entirety.

TECHNICAL FIELD

The disclosure relates to the field of communication technology, and in particular, to a service processing method and apparatus, a communication device, and a storage medium.

BACKGROUND

In related communication technologies, a base station may schedule each User Equipment (UE, also referred to as a terminal or a user) as a unit, or multiple UEs may jointly send a certain service. However, there is no correlation between services that are independently transmitted between UEs. Currently, in case that the 5th Generation Mobile Communication Technology (5G) enters more application scenarios, there is a certain demand for deterministic transmission of services that are transmitted independently between multiple UEs.

For example, in live shopping, a terminal is used to upload captured videos for item display, a terminal is used to upload videos of the live host, and a terminal is used to receive control signalings from the network side. There are some very strict synchronization requirements and a coordination mechanism of transmission power for the three terminals.

In addition, for example, in a concert, some terminals are used to upload performance videos of different musical instruments, and some terminals are used to upload performance videos of different singers. Since the same music is performed, there are also very strict synchronization requirements and a coordination mechanism of transmission power for these terminals.

However, in the related art, the network side is not able to sense the collaboration relationship of different services of multiple terminals, which makes it impossible to meet the collaboration requirements of different services of multiple terminals in a special service scenario.

SUMMARY

To solve the related technical problem, embodiments of the disclosure provide a service processing method and apparatus, a communication device, and a storage medium.

The technical solution of the disclosure is implemented as follows.

An embodiment of the disclosure provides a service processing method applied to a terminal side. The method includes the following operations.

A common function layer of at least two terminals performs a collaboration processing on data of at least two services of the at least two terminals, according to at least one of: an association relationship of the data of the at least two services of the at least two terminals, or an association relationship of the at least two services of the at least two terminals.

The data, that has been subjected to the collaboration processing, of the at least two services of the at least two terminals, is transmitted on a radio resource.

In the above solution, the association relationship may include at least one of:

a timing relationship of at least one of sending or reception between the data of the at least two services of the at least two terminals;

a pattern of at least one of the sending or the reception between the data of the at least two services of the at least two terminals;

at least one of a first-order time-derivative pattern or a second-order time-derivative pattern corresponding to time of at least one of the sending or the reception between the data of the at least two services of the at least two terminals;

a ratio or a proportional relationship of at least one of power or energy between the data of the at least two services of the at least two terminals; or a ratio or a proportional relationship of bandwidth between the data of the at least two services of the at least two terminals.

The pattern of at least one of the sending or the reception between the data of the at least two services of the at least two terminals includes a period of data sending, a starting position of data sending and a size of a sent packet.

In the above solution, the common function layer of the at least two terminals may include a Service Data Adaptation Protocol (SDAP) layer, a Packet Data Convergence Protocol (PDCP) layer, or a first function layer located between the SDAP layer and the PDCP layer, on the terminal side.

In the above solution, the operation that the common function layer of the at least two terminals performs the collaboration processing on the data of the at least two services of the at least two terminals, according to at least one of: the association relationship of the data of the at least two services of the at least two terminals, or the association relationship of the at least two services of the at least two terminals may include at least one of the following operations.

The common function layer of the at least two terminals carries, in a data packet header, at least one of a serial number or indicative information of a packet having an association relationship with the data.

The common function layer of the at least two terminals carries, in a packet header of a data packet, at least one of the serial number or the indicative information of the packet having the association relationship with the data, and indicative information of the association relationship of the data of the at least two services of the at least two terminals between the data and the packet having the association relationship with the data.

In the above solution, the method may further include the following operation.

A protocol layer above the common function layer of the at least two terminals parses, from the data packet header, at least one of information related to the packet having the association relationship with the data or information related to the association relationship, which is carried in the header, and informs the parsed information to a common function layer of a corresponding terminal.

Or, a terminal obtains at least one of the information related to the packet having the association relationship with the data or the information related to the association relationship.

In the above solution, before the common function layer of the at least two terminals performs the collaboration processing on the data of the at least two services of the at least two terminals, according to at least one of: the association relationship of the data of the at least two services of the at least two terminals, or the association relationship of the at least two services of the at least two terminals, the method may further include the following operation.

The data of the at least two services of the at least two terminals is numbered according to at least one of: the association relationship of the data of the at least two services of the at least two terminals, or the association relationship of the at least two services of the at least two terminals, to obtain multiple pieces of service data having a service number.

In the above solution, the operation that the data of the at least two services of the at least two terminals is numbered according to at least one of: the association relationship of the data of the at least two services of the at least two terminals, or the association relationship of the at least two services of the at least two terminals may include the following operations.

At least one of a timing relationship of service data of the at least two terminals or transmission power of the service data of the at least two terminals is determined according to an association relationship of services.

The service data of the at least two terminals is numbered uniformly or separately according to at least one of the timing relationship or the transmission power, to obtain the multiple pieces of service data having the service number.

In the above solution, the operation that the timing relationship of the service data of the at least two terminals is determined according to the association relationship of the services may include the following operation.

According to the association relationship of the services, at least one piece of service data of each of the at least two terminals, which is required to be sent on the same time resource, is determined from the service data of the at least two terminals, to obtain the timing relationship of the service data of the at least two terminals.

In the above solution, the operation that the timing relationship of the service data of the at least two terminals and the transmission power of the service data of the at least two terminals are determined according to the association relationship of the services may include the following operations.

According to the association relationship of the services, at least one piece of service data of each of the at least two terminals, which is required to be sent on the same time resource, is determined from the service data of the at least two terminals, to obtain the timing relationship of the service data of the at least two terminals.

Transmission power of service data of each of the at least two terminals, which is required to be sent on the same time resource, is determined according to the association relationship of the services and the timing relationship.

In the above solution, a packet header of the service data may include the service number of the service data, and an association identifier between the service data and service data of an another terminal.

In the above solution, service numbers of service data of the at least two terminals may be numbered sequentially or separately on the same time resource.

In the above solution, the operation that the data, that has been subjected to the collaboration processing, of the at least two services of the at least two terminals, is transmitted on the radio resource may include at least one of the following operations.

The terminal sends the data according to the timing relationship of at least one of the sending or the reception between the data of the at least two services of the at least two terminals.

The terminal sends the data according to the pattern of at least one of the sending or the reception between the data of the at least two services of the at least two terminals.

The terminal sends the data according to at least one of the first-order time-derivative pattern or the second-order time-derivative pattern corresponding to the time of at least one of the sending or the reception between the data of the at least two services of the at least two terminals.

The terminal sends the data according to the ratio or the proportional relationship of at least one of the power or the energy between the data of the at least two services of the at least two terminals.

In the above solution, before the data, that has been subjected to the collaboration processing, of the at least two services of the at least two terminals, is transmitted on the radio resource, the method may further include the following operation.

The terminal sends a resource request to a wireless network node through a Buffer Status Report (BSR) or a second signalling. The resource request includes second indicative information, and the second indicative information includes at least one of:

to-be-sent data requested by the terminal, and a size of a corresponding resource; or a size of data having an association relationship with the to-be-sent data requested by the terminal, and indicative information of a corresponding terminal.

In the above solution, before the data, that has been subjected to the collaboration processing, of the at least two services of the at least two terminals, is transmitted on the radio resource, the method may further include the following operation.

The terminal sends a service data packet of the at least two terminals on a preset uplink resource according to at least one of: the association relationship of the data of the at least two services of the at least two terminals, or the association relationship of the at least two services of the at least two terminals. The preset uplink resource is configured for the at least two terminals according to the association relationship.

An embodiment of the disclosure further provides a service processing method applied to a base station. The method includes the following operations.

Data that has been subjected to a collaboration processing, which is sent by at least two terminals, of at least two services of the at least two terminals is received on a radio resource.

At least one of: an association relationship of the data of the at least two services of the at least two terminals, or an association relationship of the at least two services of the at least two terminals is derived from the received data that has been subjected to the collaboration processing, which is sent by the at least two terminals, of the at least two services of the at least two terminals.

The data of the at least two services of the at least two terminals is processed according to at least one of: the derived association relationship of the data of the at least two services of the at least two terminals, or the derived association relationship of the at least two services of the at least two terminals.

In the above solution, after at least one of: the association relationship of the data of the at least two services of the at least two terminals, or the association relationship of the at least two services of the at least two terminals is derived, the method may further include the following operation.

At least one of dynamic scheduling resources or configured grant resource are allocated to the data of the at least two services of the at least two terminals, according to at least one of: the association relationship of the data of the at least two services of the at least two terminals, or the association relationship of the at least two services of the at least two terminals.

In the above solution, the association relationship may include at least one of:

a timing relationship of at least one of sending or reception between the data of the at least two services of the at least two terminals;

a pattern of at least one of the sending or the reception between the data of the at least two services of the at least two terminals;

at least one of a first-order time-derivative pattern or a second-order time-derivative pattern corresponding to time of at least one of the sending or the reception between the data of the at least two services of the at least two terminals;

a ratio or a proportional relationship of at least one of power or energy between the data of the at least two services of the at least two terminals; or a ratio or a proportional relationship of bandwidth between the data of the at least two services of the at least two terminals.

The pattern of at least one of the sending or the reception between the data of the at least two services of the at least two terminals includes a period of data sending, a starting position of data sending and a size of a sent packet.

In the above solution, the method may further include at least one of the following operations.

At least one of a serial number or indicative information of a packet having an association relationship with the data, which is carried by the common function layer of the at least two terminals in a data packet header, is received and parsed.

At least one of the serial number or the indicative information of the packet having the association relationship with the data, and indicative information of the association relationship of the data of the at least two services of the at least two terminals between the data and the packet having the association relationship with the data, which is carried by the common function layer of the at least two terminals in a packet header of a data packet, are received and parsed.

In the above solution, before the data that has been subjected to the collaboration processing, which is sent by the at least two terminals, of the at least two services of the at least two terminals is received on the radio resource, the method may further include the following operation.

At least one of information related to the packet having the association relationship with the data or information related to the association relationship is obtained, and a corresponding terminal is informed.

In the above solution, the operation that at least one of: the association relationship of the data of the at least two services of the at least two terminals, or the association relationship of the at least two services of the at least two terminals is derived from the received data that has been subjected to the collaboration processing, which is sent by the at least two terminals, of the at least two services of the at least two terminals may include the following operation.

At least one of: the association relationship of the data of the at least two services of the at least two terminals, or the association relationship of the at least two services of the at least two terminals is derived according to a number of the received data that has been subjected to the collaboration processing, which is sent by the at least two terminals, of the at least two services of the at least two terminals.

In the above solution, the operation that at least one of: the association relationship of the data of the at least two services of the at least two terminals, or the association relationship of the at least two services of the at least two terminals is derived from the received data that has been subjected to the collaboration processing, which is sent by the at least two terminals, of the at least two services of the at least two terminals may include the following operation.

At least one of a timing relationship of service data of the at least two terminals or transmission power of the service data of the at least two terminals is derived according to packet header information of the received data that has been subjected to the collaboration processing, which is sent by the at least two terminals, of the at least two services of the at least two terminals.

In the above solution, the operation that the timing relationship of the service data of the at least two terminals is derived may include the following operation.

According to the packet header information of the data of the at least two services of the at least two terminals, at least one piece of service data, which each of the at least two terminals is required to be scheduled to send on the same time resource, is determined from the service data of the at least two terminals according to an association relationship of services, to obtain the timing relationship of the service data of the at least two terminals.

An embodiment of the disclosure further provides a service processing apparatus applied to a terminal side. The apparatus includes a first processing module and a first transceiver module.

The first processing module is configured to perform, through a common function layer of at least two terminals, a collaboration processing on data of at least two services of the at least two terminals, according to at least one of: an association relationship of the data of the at least two services of the at least two terminals, or an association relationship of the at least two services of the at least two terminals.

The first transceiver module is configured to transmit, on a radio resource, the data, that has been subjected to the collaboration processing, of the at least two services of the at least two terminals.

An embodiment of the disclosure further provides a service processing apparatus applied to a base station. The apparatus includes a second transceiver module and a second processing module.

The second transceiver module is configured to receive, on a radio resource, data that has been subjected to a collaboration processing, which is sent by at least two terminals, of at least two services of the at least two terminals.

The second processing module is configured to derive, from the received data that has been subjected to the collaboration processing, which is sent by the at least two terminals, of the at least two services of the at least two terminals, at least one of: an association relationship of the data of the at least two services of the at least two terminals, or an association relationship of the at least two services of the at least two terminals; and process the data of the at least two services of the at least two terminals, according to at least one of: the derived association relationship of the data of the at least two services of the at least two terminals, or the derived association relationship of the at least two services of the at least two terminals.

An embodiment of the disclosure further provides a communication device including a processor and a memory having stored thereon a computer program. The computer program, when run by the processor, performs operations of any one of the aforementioned methods on the terminal side, or operations of any one of the aforementioned methods on the base station side.

An embodiment of the disclosure further provides a computer-readable storage medium having stored thereon instructions. The instructions, when run on a computer, enable the computer to perform operations of any one of the aforementioned methods on the terminal side, or operations of any one of the aforementioned methods on the base station side.

The aforementioned solution of the disclosure may achieve at least the following beneficial effects.

With the aforementioned solution of the disclosure, by the common function layer of the at least two terminals, the collaboration processing is performed on the data of the at least two services of the at least two terminals, according to at least one of: the association relationship of the data of the at least two services of the at least two terminals, or the association relationship of the at least two services of the at least two terminals. The data, that has been subjected to the collaboration processing, of the at least two services of the at least two terminals, is transmitted on the radio resource. In this way, it is possible for the network side to sense the collaboration relationship of different services of different terminals, thereby meeting the collaboration requirements of different services of multiple terminals in a special service scenario.

DETAILED DESCRIPTION

Figure 1:
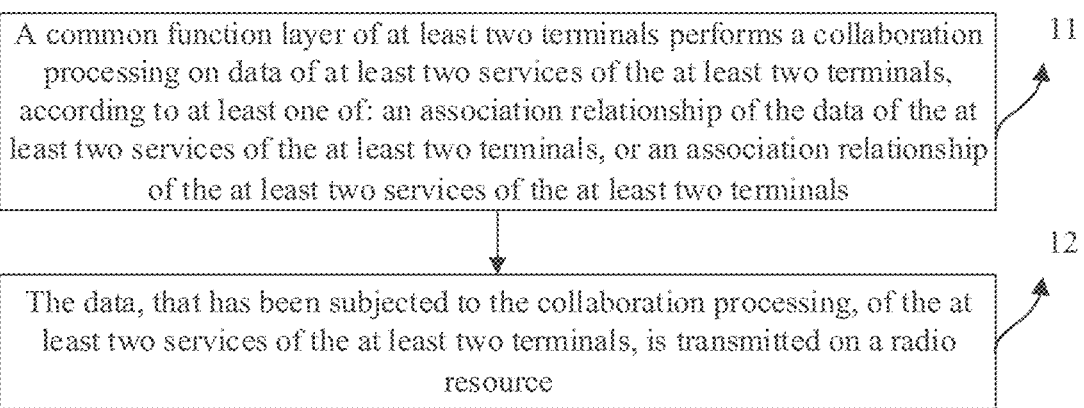
FIG. 1 is a schematic flowchart of a service processing method of an embodiment of the disclosure.

Exemplary embodiments of the disclosure will be described in detail below with reference to the drawings. Although exemplary embodiments of the disclosure are shown in the drawings, it is to be understood that the disclosure may be implemented in various forms without being limited by the embodiments set forth herein. Conversely, these embodiments are provided to enable a more thorough understanding of the disclosure and to enable a complete communication of the scope of the disclosure to those skilled in the art.

As shown in FIG. 1, an embodiment of the disclosure provides a service processing method applied to a terminal side. The method includes the following operations.

In operation 11, a common function layer of at least two terminals performs a collaboration processing on data of at least two services of the at least two terminals, according to at least one of: an association relationship of the data of the at least two services of the at least two terminals, or an association relationship of the at least two services of the at least two terminals.

Each of the at least two terminals may include a mobile phone, a tablet computer, a camera, a camcorder, or the like. The terminal may also be referred to as UE, and may also be referred to as a user. The service may include a portrait transmission service, a human voice transmission service, a background music transmission service, a transmission service of information about an environment surrounding a product or a person, or the like, in a live broadcast in a scenario such as a merchandise sale, a concert, a festival party, or the like.

Terminals may be uniformly processed by an SDAP layer, a PDCP layer, or a first function layer located between the SDAP layer and the PDCP layer, on the terminal side, and service data initiated by application layers of the at least two terminals may be obtained. In other words, the common function layer of the at least two terminals may include the SDAP layer, the PDCP layer, or the first function layer located between the SDAP layer and the PDCP layer, on the terminal side.

In operation 12, the data, that has been subjected to the collaboration processing, of the at least two services of the at least two terminals, is transmitted on a radio resource.

In various embodiments of the disclosure, by the common function layer of the at least two terminals, the collaboration processing is performed on the data of the at least two services of the at least two terminals, according to at least one of: the association relationship of the data of the at least two services of the at least two terminals, or the association relationship of the at least two services of the at least two terminals. The data, that has been subjected to the collaboration processing, of the at least two services of the at least two terminals, is transmitted on the radio resource. In this way, it is possible for the network side to sense the collaboration relationship of different services of different terminals, thereby meeting the collaboration requirements of different services of multiple terminals in a special service scenario.

In an embodiment, the association relationship (i.e., at least one of: the association relationship of the data of the at least two services of the at least two terminals, or the association relationship of the at least two services of the at least two terminals) may include at least one of:

a timing relationship of at least one of sending or reception between the data of the at least two services of the at least two terminals;

a pattern of at least one of the sending or the reception between the data of the at least two services of the at least two terminals;

at least one of a first-order time-derivative pattern or a second-order time-derivative pattern corresponding to time of at least one of the sending or the reception between the data of the at least two services of the at least two terminals;

a ratio or a proportional relationship of at least one of power or energy between the data of the at least two services of the at least two terminals; or a ratio or a proportional relationship of bandwidth between the data of the at least two services of the at least two terminals.

The pattern of at least one of the sending or the reception between the data of the at least two services of the at least two terminals includes a period of data sending, a starting position of data sending and a size of a sent packet.

In various embodiments of the disclosure, by defining the aforementioned association relationship, collaboration of services of multiple terminals may be achieved, but the aforementioned association relationship is not limited thereto. Furthermore, in a practice application, at least one of: the association relationship of the data of the at least two services of the at least two terminals, or the association relationship of the at least two services of the at least two terminals may be understood as the same association relationship, i.e., a collaboration relationship of different services of different terminals.

In an embodiment, the operation that the common function layer of the at least two terminals performs the collaboration processing on the data of the at least two services of the at least two terminals, according to at least one of: the association relationship of the data of the at least two services of the at least two terminals, or the association relationship of the at least two services of the at least two terminals may include at least one of the following operations.

The common function layer of the at least two terminals carries, in a data packet header, at least one of a serial number or indicative information of a packet having an association relationship with the data.

The common function layer of the at least two terminals carries, in a packet header of a data packet, at least one of the serial number or the indicative information of the packet having the association relationship with the data, and indicative information of the association relationship of the data of the at least two services of the at least two terminals between the data and the packet having the association relationship with the data.

In a practical application, at least one of the serial number or the indicative information of the packet having the association relationship with the data is carried in the data packet header. Therefore, it is possible to enable services of multiple terminals to achieve a collaboration of the services based on the serial number or the indicative information.

In a practical application, at least one of the serial number or the indicative information of the packet having the association relationship with the data, and the indicative information of the association relationship of the data of the at least two services of the at least two terminals between the data and the packet having the association relationship with the data are carried in the packet header of the data packet. Therefore, it is possible to enable services of multiple terminals to achieve a collaboration of services based on the serial number or the indicative information, as well as the indicative information of the association relationship of the packets.

In a practical application, the terminal (i.e., each of the at least two terminals) may carry information related to the association relationship in the data packet header, and send the information to a network node (i.e., a network side device, which may also be referred to as a network device, and specifically may be a base station), so as to enable the network node to sense the collaboration of the services of multiple terminals. In other words, it is possible to achieve the sense of the network side for the collaboration of the services of multiple terminals.

In an embodiment, the method may further include the following operation.

A protocol layer above the common function layer of the at least two terminals parses, from the data packet header, at least one of information related to the packet having the association relationship with the data or information related to the association relationship, which is carried in the header, and informs the parsed information to a common function layer of a corresponding terminal.

Or, the terminal (i.e., each of the at least two terminals) obtains at least one of the information related to the packet having the association relationship with the data or the information related to the association relationship.

In a practical application, the protocol layer above the common function layer may send the information related to the association relationship, which is carried in the data packet header, to the common function layer, so as to achieve the collaboration of services of multiple terminals.

In an embodiment, before the common function layer of the at least two terminals performs the collaboration processing on the data of the at least two services of the at least two terminals, according to at least one of: the association relationship of the data of the at least two services of the at least two terminals, or the association relationship of the at least two services of the at least two terminals, the method may further include the following operation.

The data of the at least two services of the at least two terminals is numbered according to at least one of: the association relationship of the data of the at least two services of the at least two terminals, or the association relationship of the at least two services of the at least two terminals, to obtain multiple pieces of service data having a service number.

In an embodiment, each piece of service data may be numbered according to the association relationship of the services, and service data having a service number is obtained. According to the service number, the service data is sent to the base station on a preset uplink resource at the same moment according to the association relationship (i.e., at least one of: the association relationship of the data of the at least two services of the at least two terminals, or the association relationship of the at least two services of the at least two terminals). Since services transmitted independently by each terminal are associated, it is possible to ensure that the service data having the association relationship of each terminal is sent at the same time, thereby achieving collaboration and consistency of the services of the terminals.

In an embodiment, the operation that the data of the at least two services of the at least two terminals is numbered according to at least one of: the association relationship of the data of the at least two services of the at least two terminals, or the association relationship of the at least two services of the at least two terminals may include the following operations.

At least one of a timing relationship of the service data of the at least two terminals or transmission power of the service data of the at least two terminals is determined according to an association relationship of services.

The service data of the at least two terminals is numbered uniformly or separately according to at least one of the timing relationship or the transmission power, to obtain the multiple pieces of service data having the service number.

In an embodiment, the operation that the timing relationship of the service data of the at least two terminals is determined according to the association relationship of the services may include the following operation.

According to the association relationship of the services, at least one piece of service data of each of the at least two terminals, which is required to be sent on the same time resource, is determined from the service data of the at least two terminals, to obtain the timing relationship of the service data of the at least two terminals.

In an embodiment, the operation that the timing relationship of the service data of the at least two terminals and the transmission power of the service data of the at least two terminals are determined according to the association relationship of the services may include the following operations.

According to the association relationship of the services, at least one piece of service data of each of the at least two terminals, which is required to be sent on the same time resource, is determined from the service data of the at least two terminals, to obtain the timing relationship of the service data of the at least two terminals.

Transmission power of service data of each of the at least two terminals, which is required to be sent on the same time resource, is determined according to the association relationship of the services and the timing relationship.

In an embodiment, a packet header of the service data may include a service number of the service data, and an association identifier between the service data and service data of an another terminal.

In an embodiment, service numbers of service data of the at least two terminals may be numbered sequentially or separately on the same time resource.

Figure 2:
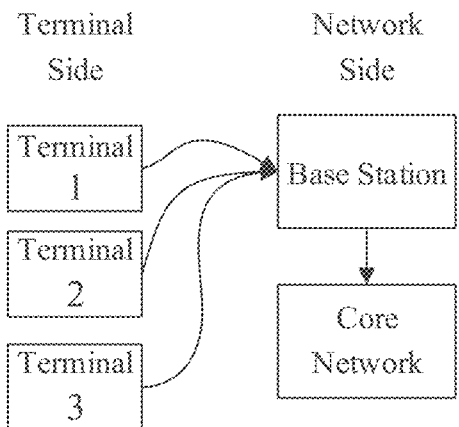
FIG. 2 is a schematic diagram of the interaction between the network side and the terminal side of an embodiment of the disclosure.

In a practical application, as shown in FIG. 2, terminal 1, terminal 2 and terminal 3 on the terminal side may separately collect a corresponding service (a portrait transmission service, a human voice transmission service, a background music transmission service, or a transmission service of an environment surrounding a product or a person), and send the service data of the service to a base station on the network side. The base station sends the service data to the core network. In this way, through the interaction process between the network side and the terminal side, collaboration and consistency of each service corresponding to each terminal may be achieved, and a smooth completion of the activity may be ensured.

Figure 3:
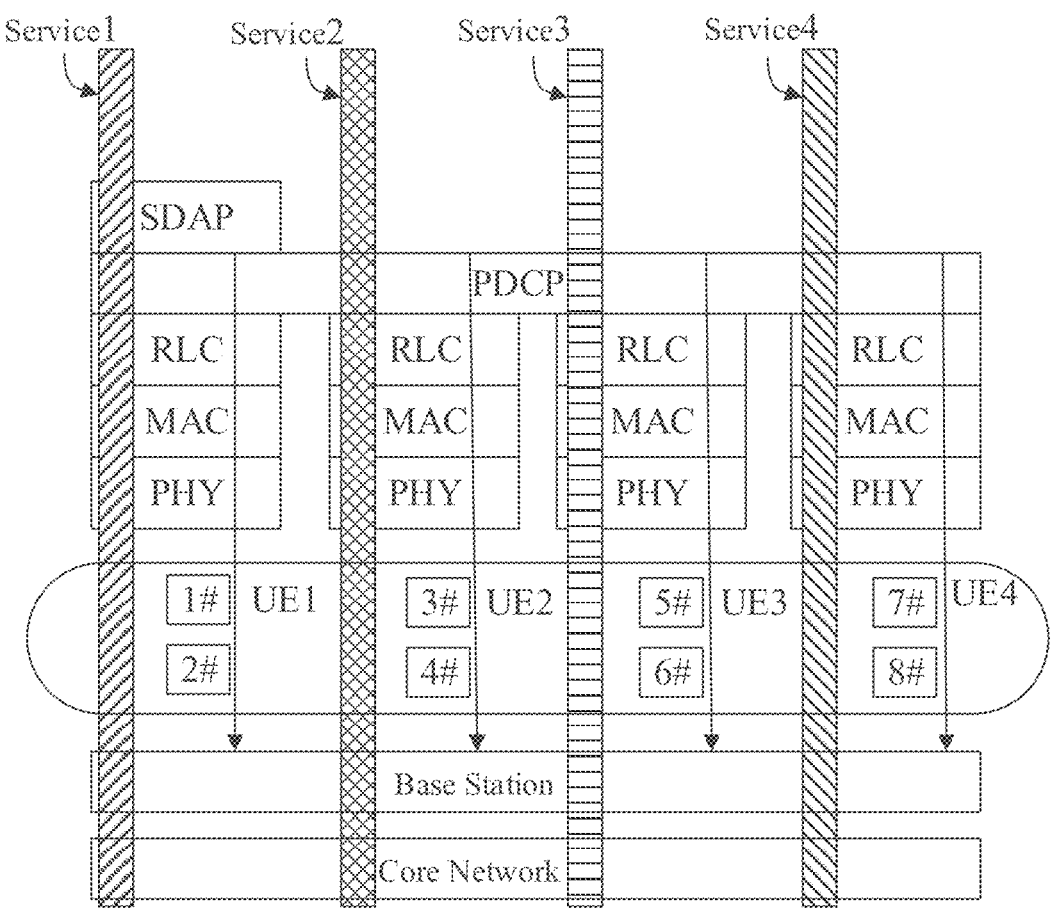
FIG. 3 is a schematic flowchart of a service processing method based on a preset moment of an embodiment of the disclosure.
Figure 4:
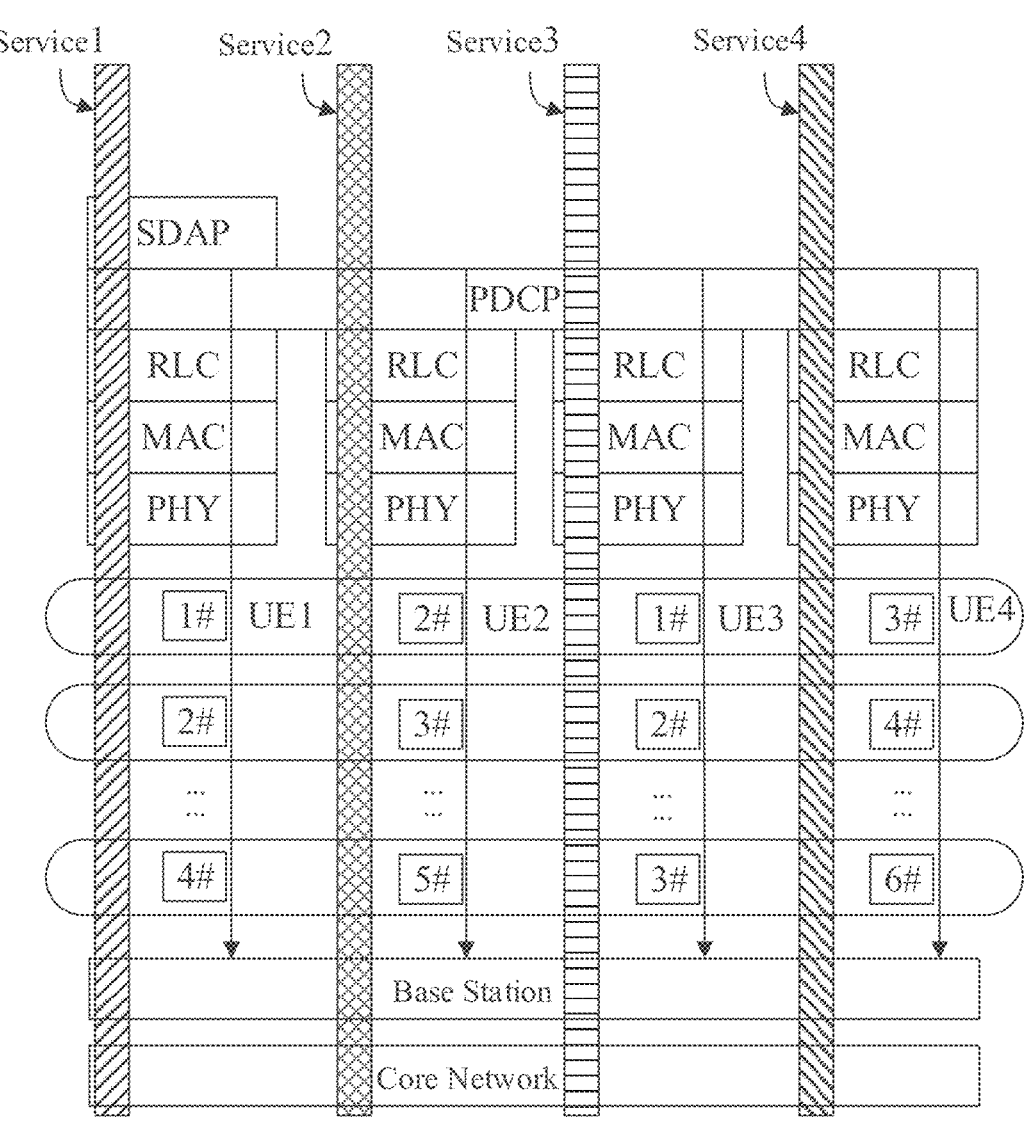
FIG. 4 is a schematic flowchart of a service processing method based on a preset period of an embodiment of the disclosure.

As shown in FIG. 3 and FIG. 4, in an embodiment, the operation 12 may include the following operation.

In operation 121, at least one of the timing relationship of the service data of the at least two terminals or the transmission power of the service data of the at least two terminals is determined according to the association relationship of services.

In order to ensure the collaboration and consistency of the output of each service (a portrait, a human voice, a background music, or an environment surrounding a product or a person) in the service scenario (a live broadcast in a scenario such as a merchandise sale, a concert, a festival party, or the like), it is necessary to determine the timing relationship of the service data of the at least two terminals. For example, in FIG. 3, service data 1 and service data 2 of terminal 1, service data 3 and service data 4 of terminal 2, service data 5 and service data 6 of terminal 3, and service data 7 and service data 8 of terminal 4 have an association relationship, and these data is required to be sent to the base station at the same moment. In FIG. 4, service data 1 of terminal 1, service data 2 of terminal 2, service data 1 of terminal 3, and service data 3 of terminal 4 have an association relationship, and these data is required to be sent to the base station at the same moment. At the next moment, service data 2 of terminal 1, service data 3 of terminal 2, service data 2 of terminal 3 and service data 4 of terminal 4 have an association relationship, and these data is required to be sent to the base station at the same moment, and so on.

In order to ensure that various types of sounds in the service scenario (a live broadcast in a scenario such as a merchandise sale, a concert, a festival party, or the like) may satisfy the actual demands, it is necessary to determine the transmission power of the service data of the at least two terminals. For example, at a first preset moment or at different preset moments, the transmission power of service data 1 of service 1 that represents the musical sound of the piano is set to X decibel milliwatts (dbm), the transmission power of service data 3 of service 2 that represents the guitar is set to 2 Xdbm, and the transmission power of service data 1 of service 3 that represents the main voice of the singer is set to 4 Xdbm.

In the aforementioned embodiment of the disclosure, the operation that the service data of the at least two terminals is numbered uniformly according to the timing relationship may include the following operations. As shown in FIG. 3, the service data of the at least two terminals is numbered uniformly at a preset moment, and the service data of the at least two terminals may be numbered by different encryption algorithms. Alternatively, as shown in FIG. 4, the service data of the at least two terminals is numbered separately according to the timing relationship, and the service data of the at least two terminals may be numbered by different encryption algorithms.

In the operation 121, the operation that the timing relationship of the service data of the at least two terminals is determined from the service data of the at least two terminals according to the association relationship of the services may include the following operation.

In operation 1211, according to the association relationship of the services, at least one piece of service data of each of the at least two terminals, which is required to be sent on the same time resource, is determined from the service data of the at least two terminals, to obtain the timing relationship of the service data of the at least two terminals.

Alternatively, in the operation 121, the operation that the timing relationship of the service data of the at least two terminals is determined from the service data of the at least two terminals according to the association relationship of the services may also include the following operations.

In operation 1212, according to the association relationship of the services, at least one piece of the service data of each of the at least two terminals, which is required to be sent on the same time resource, is determined from the service data of the at least two terminals, to obtain the timing relationship of the service data of the at least two terminals.

In operation 1213, the transmission power of the service data of each of the at least two terminals, which is required to be sent on the same time resource, is determined according to the association relationship of the services and the timing relationship.

For example, in a concert scenario, there are sounds such as the main voice of the singer, harmonies of other singers, musical sounds of various types of instruments such as the piano, the guitar, the bass, the drum, or the like. In order to ensure the performance effect of the concert, there are different loudness requirements for the aforementioned various types of sounds. In such case, according to the actual requirements, at a first preset moment, the transmission power of service data 1 of service 1 that represents the musical sound of the piano may be set to Xdbm, the transmission power of service data 3 of service 2 that represents the guitar may be set to 2 Xdbm, and the transmission power of service data 1 of service 3 that represents the main voice of the singer may be set to 4 Xdbm.

In a practical application, according to actual requirements, it may be ensured that the service scenarios or sounds captured by each terminal keep synchronized at the preset moment or timing, and that a harmonious output of various types of sounds is satisfied.

In the aforementioned embodiment of the disclosure, the packet header of the service data may include the service number of the service data, and the association identifier between the service data and the service data of an another terminal.

The terminal sends the service data to the base station. After receiving and parsing the service data, the base station may send the service data having the association identifier to the core network at the same time. After receiving the service data, the core network may output the contents of the service data to a terminal of a viewer. Alternatively, for service data of different services of different terminals, the service data may be arranged by unified serial numbers according to the association relationship of the different services.

In an embodiment, the service numbers of the service data of the at least two terminals may be numbered sequentially or separately on the same time resource.

Here, the packet header of the service data carries the service number, and the association identifier between the service data and the service data of an another terminal. The base station receives and parses the service data, and may send associated service data at the same time, which ensures the collaboration and consistency of the services.

In an embodiment, the operation that the data, that has been subjected to the collaboration processing, of the at least two services of the at least two terminals, is transmitted on the radio resource may include at least one of the following operations.

The terminal (i.e., each of the at least two terminals) sends the data according to the timing relationship of at least one of the sending or the reception between the data of the at least two services of the at least two terminals.

The terminal sends the data according to the pattern of at least one of the sending or the reception between the data of the at least two services of the at least two terminals.

The terminal sends the data according to at least one of the first-order time-derivative pattern or the second-order time-derivative pattern corresponding to the time of at least one of the sending or the reception between the data of the at least two services of the at least two terminals.

The terminal sends the data according to the ratio or the proportional relationship of at least one of the power or the energy between the data of the at least two services of the at least two terminals.

The terminal sends the data according to the aforementioned relationship, such that the network device (which may specifically be a base station) may sense the collaboration relationship of the data of these services, thereby achieving collaboration of services of multiple terminals.

In an embodiment, before the data, that has been subjected to the collaboration processing, of the at least two services of the at least two terminals, is transmitted on the radio resource, the method may further include the following operation.

The terminal (i.e., each of the at least two terminals) sends a resource request to a wireless network node through a BSR or a second signalling. The resource request includes second indicative information, and the second indicative information includes at least one of:

to-be-sent data requested by the terminal, and a size of a corresponding resource; or a size of data having an association relationship with the to-be-sent data requested by the terminal, and indicative information of a corresponding terminal.

The terminal requests a corresponding resource which is bonded to a service collaborative with the terminal, thereby achieving the collaboration of the service of the terminal.

In an embodiment, before the data, that has been subjected to the collaboration processing, of the at least two services of the at least two terminals, is transmitted on the radio resource, the method may further include the following operation.

The terminal (i.e., each of the at least two terminals) sends a service data packet of the at least two terminals on a preset uplink resource according to at least one of: the association relationship of the data of the at least two services of the at least two terminals, or the association relationship of the at least two services of the at least two terminals. The preset uplink resource is configured for the at least two terminals according to the association relationship (i.e., at least one of: the association relationship of the data of the at least two services of the at least two terminals, or the association relationship of the at least two services of the at least two terminals).

In the aforementioned embodiment of the disclosure, data packets of two services of multiple terminals are processed according to the association relationship of the services by the common function layer on the terminal side, thereby enabling data of at least two services of at least two terminals to be processed cooperatively.

An embodiment of the disclosure further provides a service processing method applied to a base station. The method includes the following operations.

Data that has been subjected to a collaboration processing, which is sent by at least two terminals, of at least two services of the at least two terminals is received on a radio resource.

At least one of: an association relationship of the data of the at least two services of the at least two terminals, or an association relationship of the at least two services of the at least two terminals is derived from the received data that has been subjected to the collaboration processing, which is sent by the at least two terminals, of the at least two services of the at least two terminals.

The data of the at least two services of the at least two terminals is processed according to at least one of: the derived association relationship of the data of the at least two services of the at least two terminals, or the derived association relationship of the at least two services of the at least two terminals.

The base station is required to determine a Quality of Service (QOS) of the data of the service corresponding to each terminal, a size of the service data, and an arrival time of the service data.

In an embodiment, after at least one of: the association relationship of the data of the at least two services of the at least two terminals, or the association relationship of the at least two services of the at least two terminals is derived, the method may further include the following operation.

At least one of dynamic scheduling resources or configured grant resource are allocated to the data of the at least two services of the at least two terminals, according to at least one of: the association relationship of the data of the at least two services of the at least two terminals, or the association relationship of the at least two services of the at least two terminals.

Here, for a periodic Up Link (UL) service, the base station may pre-configure arrival time associated with different services, and a serial number of the service data, and bind them with statically configured resources. Alternatively, the base station may carry a binding relationship within a preset cycle in a Media Access Control (MAC) Control Element (CE). The terminal sends the uplink data according to the binding relationship of the serial number of the service data, the sending time and the statically configured resources. The base station may apply the aforementioned information to different uplink resource allocation for different terminals.

In an embodiment, the association relationship (i.e., at least one of: the association relationship of the data of the at least two services of the at least two terminals, or the association relationship of the at least two services of the at least two terminals) may include at least one of:

a timing relationship of at least one of sending or reception between the data of the at least two services of the at least two terminals;

a pattern of at least one of the sending or the reception between the data of the at least two services of the at least two terminals;

at least one of a first-order time-derivative pattern or a second-order time-derivative pattern corresponding to time of at least one of the sending or the reception between the data of the at least two services of the at least two terminals;

a ratio or a proportional relationship of at least one of power or energy between the data of the at least two services of the at least two terminals; or a ratio or a proportional relationship of bandwidth between the data of the at least two services of the at least two terminals.

The pattern of at least one of the sending or the reception between the data of the at least two services of the at least two terminals includes a period of data sending, a starting position of data sending and a size of a sent packet.

In an embodiment, the method may further include at least one of the following operations.

At least one of a serial number or indicative information of a packet having an association relationship with the data, which is carried by the common function layer of the at least two terminals in a data packet header, is received and parsed.

At least one of the serial number or the indicative information of the packet having the association relationship with the data, and indicative information of the association relationship of the data of the at least two services of the at least two terminals between the data and the packet having the association relationship with the data, which is carried by the common function layer of the at least two terminals in a packet header of a data packet, are received and parsed.

In an embodiment, before the data that has been subjected to the collaboration processing, which is sent by the at least two terminals, of the at least two services of the at least two terminals is received on the radio resource, the method may further include the following operation.

At least one of information related to the packet having the association relationship with the data or information related to the association relationship is obtained, and a corresponding terminal is informed.

In an embodiment, the operation that at least one of: the association relationship of the data of the at least two services of the at least two terminals, or the association relationship of the at least two services of the at least two terminals is derived from the received data that has been subjected to the collaboration processing, which is sent by the at least two terminals, of the at least two services of the at least two terminals may include the following operation.

At least one of: the association relationship of the data of the at least two services of the at least two terminals, or the association relationship of the at least two services of the at least two terminals is derived according to a number of the received data that has been subjected to the collaboration processing, which is sent by the at least two terminals, of the at least two services of the at least two terminals.

In an embodiment, the operation that at least one of: the association relationship of the data of the at least two services of the at least two terminals, or the association relationship of the at least two services of the at least two terminals is derived from the received data that has been subjected to the collaboration processing, which is sent by the at least two terminals, of the at least two services of the at least two terminals may include the following operation.

At least one of a timing relationship of service data of the at least two terminals or transmission power of the service data of the at least two terminals is derived according to packet header information of the received data that has been subjected to the collaboration processing, which is sent by the at least two terminals, of the at least two services of the at least two terminals.

In an embodiment, the operation that the timing relationship of the service data of the at least two terminals is derived may include the following operation.

According to the packet header information of the data of the at least two services of the at least two terminals, at least one piece of service data, which each of the at least two terminals is required to be scheduled to send on the same time resource, is determined from the service data of the at least two terminals according to an association relationship of services, to obtain the timing relationship of the service data of the at least two terminals.

The aforementioned method embodiments applied to the base station are method embodiments corresponding to the aforementioned method on the terminal side. All implementations in the aforementioned method embodiments on the terminal side are applicable to the method embodiments on the base station side. Through the interaction process between the terminal side and the network side, according to actual requirements, various services of various terminals having a collaboration relationship may be set with transmission powers and sent uniformly according to a moment or a timing relationship, such that collaboration of different services of different terminals may be achieved, and thus synchronous execution of various services of various terminals may be achieved.

Figure 5:
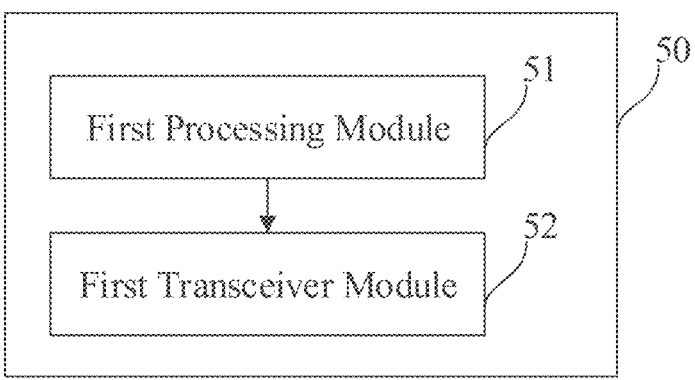
FIG. 5 is a schematic structure diagram of a service processing apparatus of an embodiment of the disclosure.
Figure 6:
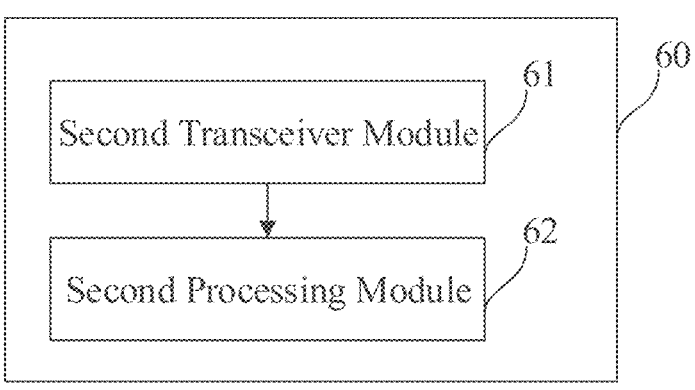
FIG. 6 is a schematic structure diagram of another service processing apparatus of an embodiment of the disclosure.

As shown in FIG. 5, an embodiment of the disclosure further provides a service processing apparatus 50 applied to a terminal side (which may be disposed on any terminal). The apparatus includes a first processing module 51 and a first transceiver module 52.

The first processing module 51 is configured to perform, through a common function layer of at least two terminals, a collaboration processing on data of at least two services of the at least two terminals, according to at least one of: an association relationship of the data of the at least two services of the at least two terminals, or an association relationship of the at least two services of the at least two terminals.

The first transceiver module 52 is configured to transmit, on a radio resource, the data, that has been subjected to the collaboration processing, of the at least two services of the at least two terminals.

In an embodiment, the association relationship (i.e., at least one of: the association relationship of the data of the at least two services of the at least two terminals, or the association relationship of the at least two services of the at least two terminals) includes at least one of:

a timing relationship of at least one of sending or reception between the data of the at least two services of the at least two terminals;

a pattern of at least one of the sending or the reception between the data of the at least two services of the at least two terminals;

at least one of a first-order time-derivative pattern or a second-order time-derivative pattern corresponding to time of at least one of the sending or the reception between the data of the at least two services of the at least two terminals;

a ratio or a proportional relationship of at least one of power or energy between the data of the at least two services of the at least two terminals; or a ratio or a proportional relationship of bandwidth between the data of the at least two services of the at least two terminals.

The pattern of at least one of the sending or the reception between the data of the at least two services of the at least two terminals includes a period of data sending, a starting position of data sending and a size of a sent packet.

In an embodiment, the common function layer of the at least two terminals includes an SDAP layer, a PDCP layer, or a first function layer located between the SDAP layer and the PDCP layer, on the terminal side.

In an embodiment, the first processing module 51 is further configured to:

carry, by the common function layer of the at least two terminals, in a data packet header, at least one of a serial number or indicative information of a packet having an association relationship with the data; and/or, carry, by the common function layer of the at least two terminals, in a packet header of a data packet, at least one of the serial number or the indicative information of the packet having the association relationship with the data, and indicative information of the association relationship of the data of the at least two services of the at least two terminals between the data and the packet having the association relationship with the data.

In an embodiment, the first processing module 51 is further configured to:

parse, by a protocol layer above the common function layer of the at least two terminals, from the data packet header, information related to the association relationship, which is carried in the header, and inform the parsed information to a common function layer of a corresponding terminal.

Or, obtain, by a terminal (i.e., each of the at least two terminals), at least one of the information related to the packet having the association relationship with the data or the information related to the association relationship.

In an embodiment, the first processing module 51 is further configured to:

number the data of the at least two services of the at least two terminals according to at least one of: the association relationship of the data of the at least two services of the at least two terminals, or the association relationship of the at least two services of the at least two terminals, to obtain multiple pieces of service data having a service number.

In an embodiment, the first processing module 51 is further configured to:

determine, according to an association relationship of services, at least one of a timing relationship of service data of the at least two terminals or transmission power of the service data of the at least two terminals; and number, according to at least one of the timing relationship or the transmission power, the service data of the at least two terminals uniformly or separately, to obtain the multiple pieces of service data having the service number.

In an embodiment, the first processing module 51 is further configured to:

determine, according to the association relationship of the services, at least one piece of service data of each of the at least two terminals, which is required to be sent on the same time resource, from the service data of the at least two terminals, to obtain the timing relationship of the service data of the at least two terminals.

In an embodiment, the first processing module 51 is further configured to:

determine, according to the association relationship of the services, at least one piece of service data of each of the at least two terminals, which is required to be sent on the same time resource, from the service data of the at least two terminals, to obtain the timing relationship of the service data of the at least two terminals; and determine, according to the association relationship of the services and the timing relationship, transmission power of service data of each of the at least two terminals, which is required to be sent on the same time resource.

In an embodiment, a packet header of the service data includes a service number of the service data, and an association identifier between the service data and service data of an another terminal.

In an embodiment, service numbers of service data of the at least two terminals are numbered sequentially or separately on the same time resource.

In an embodiment, the first transceiver module 52 is further configured to perform at least one of:

sending, by the terminal (i.e., each of the at least two terminals), data, according to the timing relationship of at least one of the sending or the reception between the data of the at least two services of the at least two terminals;

sending, by the terminal, the data, according to the pattern of at least one of the sending or the reception between the data of the at least two services of the at least two terminals;

sending, by the terminal, the data, according to at least one of the first-order time-derivative pattern or the second-order time-derivative pattern corresponding to the time of at least one of the sending or the reception between the data of the at least two services of the at least two terminals; or sending, by the terminal, the data, according to the ratio or the proportional relationship of at least one of the power or the energy between the data of the at least two services of the at least two terminals.

In an embodiment, before the data, that has been subjected to the collaboration processing, of the at least two services of the at least two terminals, is transmitted on the radio resource, the first transceiver module 52 is further configured to:

send a resource request to a wireless network node through a BSR or a second signalling. The resource request includes second indicative information, and the second indicative information includes at least one of:

to-be-sent data requested by the terminal (i.e., each of the at least two terminals), and a size of a corresponding resource; or a size of data having an association relationship with the to-be-sent data requested by the terminal, and indicative information of a corresponding terminal.

In an embodiment, before the data, that has been subjected to the collaboration processing, of the at least two services of the at least two terminals, is transmitted on the radio resource, the first transceiver module 52 is further configured to:

send a service data packet of the at least two terminals on a preset uplink resource according to at least one of: the association relationship of the data of the at least two services of the at least two terminals, or the association relationship of the at least two services of the at least two terminals. The preset uplink resource is configured for the at least two terminals according to the association relationship (i.e., at least one of: the association relationship of the data of the at least two services of the at least two terminals, or the association relationship of the at least two services of the at least two terminals).

It is to be noted that the apparatus is an apparatus corresponding to the aforementioned service processing method on the terminal side, and all implementations of the aforementioned method are applicable to the embodiments of the apparatus and may achieve the same technical effect.

An embodiment of the disclosure further provides a service processing apparatus 60 applied to a base station (which may be disposed on the base station). The apparatus includes a second transceiver module 61 and a second processing module 62.

The second transceiver module 61 is configured to receive, on a radio resource, data that has been subjected to a collaboration processing, which is sent by at least two terminals, of at least two services of the at least two terminals.

The second processing module 62 is configured to derive, from the received data that has been subjected to the collaboration processing, which is sent by the at least two terminals, of the at least two services of the at least two terminals, at least one of: an association relationship of the data of the at least two services of the at least two terminals, or an association relationship of the at least two services of the at least two terminals; and process the data of the at least two services of the at least two terminals, according to at least one of: the derived association relationship of the data of the at least two services of the at least two terminals, or the derived association relationship of the at least two services of the at least two terminals.

In an embodiment, after at least one of: the association relationship of the data of the at least two services of the at least two terminals, or the association relationship of the at least two services of the at least two terminals is derived, the second processing module 62 is further configured to:

allocate at least one of dynamic scheduling resources or configured grant resource to the data of the at least two services of the at least two terminals, according to at least one of: the association relationship of the data of the at least two services of the at least two terminals, or the association relationship of the at least two services of the at least two terminals.

In an embodiment, the association relationship (i.e., at least one of: the association relationship of the data of the at least two services of the at least two terminals, or the association relationship of the at least two services of the at least two terminals) includes at least one of:

a timing relationship of at least one of sending or reception between the data of the at least two services of the at least two terminals;

a pattern of at least one of the sending or the reception between the data of the at least two services of the at least two terminals;

at least one of a first-order time-derivative pattern or a second-order time-derivative pattern corresponding to time of at least one of the sending or the reception between the data of the at least two services of the at least two terminals;

a ratio or a proportional relationship of at least one of power or energy between the data of the at least two services of the at least two terminals; or a ratio or a proportional relationship of bandwidth between the data of the at least two services of the at least two terminals.

The pattern of at least one of the sending or the reception between the data of the at least two services of the at least two terminals includes a period of data sending, a starting position of data sending and a size of a sent packet.

In an embodiment, the second transceiver module 61 is further configured to:

receive and parse at least one of a serial number or indicative information of a packet having an association relationship with the data, which is carried by the common function layer of the at least two terminals in a data packet header; and/or receive and parse at least one of the serial number or the indicative information of the packet having the association relationship with the data, and indicative information of the association relationship of the data of the at least two services of the at least two terminals between the data and the packet having the association relationship with the data, which is carried by the common function layer of the at least two terminals in a packet header of a data packet.

In an embodiment, before the data that has been subjected to the collaboration processing, which is sent by the at least two terminals, of the at least two services of the at least two terminals is received on the radio resource, the second transceiver module 61 is further configured to:

obtain at least one of information related to the packet having the association relationship with the data or information related to the association relationship, and inform a corresponding terminal.

In an embodiment, the second processing module 62 is further configured to:

derive at least one of: the association relationship of the data of the at least two services of the at least two terminals, or the association relationship of the at least two services of the at least two terminals, according to a number of the received data that has been subjected to the collaboration processing, which is sent by the at least two terminals, of the at least two services of the at least two terminals.

In an embodiment, the second processing module 62 is further configured to:

derive at least one of a timing relationship of service data of the at least two terminals or transmission power of the service data of the at least two terminals according to packet header information of the received data that has been subjected to the collaboration processing, which is sent by the at least two terminals, of the at least two services of the at least two terminals.

In an embodiment, the second processing module 62 is further configured to:

according to the packet header information of the data of the at least two services of the at least two terminals, determine, according to an association relationship of services, at least one piece of service data, which each of the at least two terminals is required to be scheduled to send on the same time resource, from the service data of the at least two terminals, to obtain the timing relationship of the service data of the at least two terminals.

It is to be noted that the apparatus is an apparatus corresponding to the aforementioned service processing method on the base station side, and all implementations of the aforementioned method are applicable to the embodiments of the apparatus and may achieve the same technical effect.

An embodiment of the disclosure further provides a communication device including a processor and a memory having stored thereon a computer program. The computer program, when run by the processor, performs operations of any one of the aforementioned methods on the terminal side, or operations of any one of the aforementioned methods on the base station side. All the implementations in the aforementioned method embodiments are applicable in this embodiment and may achieve the same technical effect.

An embodiment of the disclosure further provides a computer-readable storage medium having stored thereon instructions. The instructions, when run on a computer, enable the computer to perform operations of any one of the aforementioned methods on the terminal side, or operations of any one of the aforementioned methods on the base station side. All the implementations in the aforementioned method embodiments are applicable in this embodiment and may achieve the same technical effect.

Those of ordinary skill in the art may realize that the units and algorithm steps of each example described in combination with the embodiments disclosed in the disclosure may be implemented by electronic hardware, or a combination of computer software and electronic hardware. Whether these functions are executed in a hardware or software manner depends on specific applications and design constraints of the technical solution. Professionals may implement the described functions for each specific application by using different methods, but such implementation shall not be regarded as outside the scope of the disclosure.

Those skilled in the art may clearly understand that for a convenient and brief description, specific operation processes of the systems, apparatuses and units described above may be referred to corresponding processes in the aforementioned method embodiments and will not be repeated here.

In the embodiments provided by the disclosure, it is to be understood that the disclosed apparatuses and methods may be implemented in other manners. For example, the apparatus embodiments described above are only schematic. For example, division of the units is only a kind of logic function division, and other division manners may be adopted during a practical implementation. For example, multiple units or components may be combined or integrated into another system, or some features may be neglected or not executed. In addition, coupling or direct coupling or communication connection between various displayed or discussed components may be indirect coupling or communication connection through some interfaces, apparatuses or units, and may be electrical, mechanical, or in other forms.

Units described as separate components may or may not be physically separated, and components displayed as units may or may not be physical units, that is, may be located in the same place, or may also be distributed to multiple network units. Part or all of the units may be selected according to actual requirements to implement the purpose of the solution of the embodiments.

In addition, various functional units in various embodiments of the disclosure may be integrated into a processing unit, or each unit may physically exist independently, or two or more than two units may be integrated into a unit.

When implemented in form of a software functional unit and sold or used as an independent product, the functions may be stored in a computer-readable storage medium. Based on such understanding, the technical solution of the disclosure substantially or parts making contributions to the related art or part of the technical solution may be embodied in form of a software product. The computer software product is stored in a storage medium, including several instructions for enabling a computer device (which may be a personal computer, a server, a network device, or the like) to perform all or part of the operations of the methods in various embodiments of the disclosure. The abovementioned storage medium includes various media capable of storing program codes, such as a USB disk, a mobile hard disk, a Read Only Memory (ROM), a Random Access Memory (RAM), a magnetic disk, an optical disk, or the like.

Furthermore, it is to be noted that in the apparatuses and methods of the disclosure, it is apparent that various components or operations may be decomposed and/or re-combined. These decompositions and/or re-combinations should be regarded as equivalent solutions of the disclosure. Moreover, operations for performing the aforementioned series of processing may be naturally performed chronologically in the illustrated order, but it is not necessary that they are performed chronologically. Some operations may be performed in parallel or independently of each other. It is to be understood by those of ordinary skill in the art that all or any of the operations or components of the methods and apparatuses of the disclosure may be implemented by hardware, firmware, software, or a combination thereof, in any computing apparatus (including a processor, a storage medium, or the like) or a network of a computing apparatus, which is achievable by those of ordinary skill in the art using their basic programming skills after reading the illustration of the disclosure.

Therefore, the purpose of the disclosure may further be achieved by running a program or a set of programs on any computing apparatus. The computing apparatus may be a general purpose apparatus of the common knowledge. Therefore, the purpose of the disclosure may also be achieved simply by providing a program product including program codes for implementing the methods or apparatuses. That is to say, such program product also constitutes the disclosure, and a storage medium storing such program product also constitutes the disclosure. It is apparent that the storage medium may be any storage medium of the common knowledge or any storage medium developed in the future.

It is further to be noted that in the apparatuses and methods of the disclosure, it is apparent that various components or operations may be decomposed and/or re-combined. These decompositions and/or re-combinations should be regarded as equivalent solutions of the disclosure. Moreover, operations for performing the aforementioned series of processing may be naturally performed chronologically in the illustrated order, but it is not necessary that they are performed chronologically. Some operations may be performed in parallel or independently of each other.

The foregoing are some implementations of the disclosure. It is to be noted that for those of ordinary skill in the art, a number of improvements and embellishments may be made without departing from the principles described in the disclosure, and these improvements and embellishments should also be regarded as the scope of protection of the disclosure.

The invention claimed is:

1. A service processing method, applied to a terminal side, comprising:

performing, by a common function layer of at least two terminals, a collaboration processing on at least two service data from the at least two terminals, according to at least one of: an association relationship of the at least two service data from the at least two terminals, or an association relationship of the at least two services of the at least two terminals; and transmitting, on a radio resource, own service data in the at least two service data from the at least two terminals, that has been subjected to the collaboration processing;

wherein before performing, by the common function layer of the at least two terminals, the collaboration processing on the at least two service data from the at least two terminals, according to at least one of: the association relationship of the at least two service data from the at least two terminals, or the association relationship of the at least two services of the at least two terminals, the method further comprises:

numbering the at least two service data from the at least two terminals uniformly according to at least one of: the association relationship of the at least two service data from the at least two terminals, or the association relationship of the at least two services of the at least two terminals, to obtain a plurality of pieces of service data each piece of which has a service number; or before transmitting, on the radio resource, the own service data in the at least two service data from the at least two terminals, that has been subjected to the collaboration processing, the method further comprises:

sending a resource request to a base station through a Buffer Status Report (BSR) or a second signalling, wherein the resource request comprises second indicative information, and the second indicative information comprises a size of data having an association relationship with to-be-sent data requested by the terminal and indicative information of a corresponding terminal.

2. The service processing method of claim 1, wherein association relationship comprises at least one of:

a timing relationship of at least one of sending or reception between the at least two service data from the at least two terminals;

a pattern of at least one of the sending or the reception between the at least two service data from the at least two terminals;

at least one of a first-order time-derivative pattern or a second-order time-derivative pattern corresponding to time of at least one of the sending or the reception between the at least two service data from the at least two terminals;

a ratio or a proportional relationship of at least one of power or energy between the at least two service data from the at least two terminals; or a ratio or a proportional relationship of bandwidth between the at least two service data from the at least two terminals;

wherein the pattern of at least one of the sending or the reception between the at least two service data from the at least two terminals comprises a period of data sending, a starting position of data sending and a size of a sent packet.

3. The service processing method of claim 1, wherein the common function layer of the at least two terminals comprises a Service Data Adaptation Protocol (SDAP) layer, a Packet Data Convergence Protocol (PDCP) layer, or a first function layer located between the SDAP layer and the PDCP layer, on the terminal side.

4. The service processing method of claim 1, wherein performing, by the common function layer of the at least two terminals, the collaboration processing on the at least two service data from the at least two terminals, according to at least one of: the association relationship of the at least two service data from the at least two terminals, or the association relationship of the at least two services of the at least two terminals comprises at least one of:

carrying, by the common function layer of the at least two terminals, in a data packet header, at least one of a serial number or indicative information of a packet having an association relationship with the data; or carrying, by the common function layer of the at least two terminals, in a packet header of a data packet, at least one of the serial number or the indicative information of the packet having the association relationship with the data, and indicative information of the association relationship of the at least two service data from the at least two terminals between the data and the packet having the association relationship with the data.

5. The service processing method of claim 1, further comprising:

parsing, by a protocol layer above the common function layer of the at least two terminals, from a data packet header, at least one of information related to a packet having an association relationship with the data or information related to the association relationship, which is carried in the header, and informing the parsed information to a common function layer of a corresponding terminal; or obtaining, by a terminal, at least one of the information related to the packet having the association relationship with the data or the information related to the association relationship.

6. The service processing method of claim 1, wherein transmitting, on the radio resource, the at least two service data from the at least two terminals, that has been subjected to the collaboration processing comprises at least one of:

sending, by a terminal, data, according to a timing relationship of at least one of sending or reception between the at least two service data from the at least two terminals;

sending, by the terminal, the data, according to a pattern of at least one of the sending or the reception between the at least two service data from the at least two terminals;

sending, by the terminal, the data, according to at least one of a first-order time-derivative pattern or a second-order time-derivative pattern corresponding to time of at least one of the sending or the reception between the at least two service data from the at least two terminals; or sending, by the terminal, the data, according to a ratio or a proportional relationship of at least one of power or energy between the at least two service data from the at least two terminals.

7. The service processing method of claim 1, wherein the second indicative information further comprises:

to-be-sent data requested by the terminal, and a size of a corresponding resource.

8. The service processing method of claim 1, wherein numbering the at least two service data from the at least two terminals uniformly according to at least one of: the association relationship of the at least two service data from the at least two terminals, or the association relationship of the at least two services of the at least two terminals comprises:

determining, according to an association relationship of services, at least one of a timing relationship of service data of the at least two terminals or transmission power of the service data of the at least two terminals; and numbering, according to at least one of the timing relationship or the transmission power, the service data of the at least two terminals uniformly, to obtain the plurality of pieces of service data each piece of which has a service number.

9. The service processing method of claim 8, wherein determining, according to the association relationship of the services, the timing relationship of the service data of the at least two terminals comprises:

determining, according to the association relationship of the services, at least one piece of service data of each of the at least two terminals, which is required to be sent on a same time resource, from the service data of the at least two terminals, to obtain the timing relationship of the service data of the at least two terminals.

10. The service processing method of claim 8, wherein determining, according to the association relationship of the services, the timing relationship of the service data of the at least two terminals and the transmission power of the service data of the at least two terminals comprises:

determining, according to the association relationship of the services, at least one piece of service data of each of the at least two terminals, which is required to be sent on a same time resource, from the service data of the at least two terminals, to obtain the timing relationship of the service data of the at least two terminals; and determining, according to the association relationship of the services and the timing relationship, transmission power of service data of each of the at least two terminals, which is required to be sent on the same time resource.

11. The service processing method of claim 1, wherein a packet header of the service data comprises a service number of the service data, and an association identifier between the service data and service data of an another terminal.

12. The service processing method of claim 1, wherein service numbers of service data of the at least two terminals are numbered sequentially or separately on a same time resource.

13. A service processing method, applied to a base station, comprising:

receiving terminal's own service data in at least two service data from the at least two terminals, that has been subjected to a collaboration processing and is sent by at least two terminals, on a radio resource;

deriving, from the terminal's own service data in the at least two received service data from the at least two terminals that has been subjected to the collaboration processing and is sent by the at least two terminals, at least one of: an association relationship of the at least two service data from the at least two terminals, or an association relationship of the at least two services of the at least two terminals; and processing the at least two service data from the at least two terminals, according to at least one of: the derived association relationship of the at least two service data from the at least two terminals, or the derived association relationship of the at least two services of the at least two terminals;

wherein deriving, from the at least two received service data from the at least two terminals that has been subjected to the collaboration processing and is sent by the at least two terminals, at least one of: the association relationship of the at least two service data from the at least two terminals, or the association relationship of the at least two services of the at least two terminals comprises:

deriving at least one of the association relationship of the at least two service data from the at least two terminals, or the association relationship of the at least two services of the at least two terminals, according to a number of the at least two received service data from the at least two terminals that has been subjected to the collaboration processing and is sent by the at least two terminals; or before receiving the terminal's own service data in the at least two service data from the at least two terminals, that has been subjected to a collaboration processing and is sent by at least two terminals, on a radio resource, the method further comprises:

receiving a resource request sent through a Buffer Status Report (BSR) or a second signalling, wherein the resource request comprises second indicative information, and the second indicative information comprises a size of data having an association relationship with to-be-sent data requested by the terminal and indicative information of a corresponding terminal.

14. The service processing method of claim 13, wherein after deriving at least one of: the association relationship of the at least two service data from the at least two terminals, or the association relationship of the at least two services of the at least two terminals, the method further comprises:

allocating at least one of dynamic scheduling resources or configured grant resource to the at least two service data from the at least two terminals, according to at least one of: the association relationship of the at least two service data from the at least two terminals, or the association relationship of the at least two services of the at least two terminals.

15. The service processing method of claim 13, wherein the association relationship comprises at least one of:

a timing relationship of at least one of sending or reception between the at least two service data from the at least two terminals;

a pattern of at least one of the sending or the reception between the at least two service data from the at least two terminals;

at least one of a first-order time-derivative pattern or a second-order time-derivative pattern corresponding to time of at least one of the sending or the reception between the at least two service data from the at least two terminals;

a ratio or a proportional relationship of at least one of power or energy between the at least two service data from the at least two terminals; or a ratio or a proportional relationship of bandwidth between the at least two service data from the at least two terminals;

wherein the pattern of at least one of the sending or the reception between the at least two service data from the at least two terminals comprises a period of data sending, a starting position of data sending and a size of a sent packet.

16. The service processing method of claim 13, wherein the method further comprises at least one of:

receiving and parsing at least one of a serial number or indicative information of a packet having an association relationship with the data, which is carried by the common function layer of the at least two terminals in a data packet header; or receiving and parsing at least one of the serial number or the indicative information of the packet having the association relationship with the data, and indicative information of the association relationship of the at least two service data from the at least two terminals between the data and the packet having the association relationship with the data, which is carried by the common function layer of the at least two terminals in a packet header of a data packet.

17. The service processing method of claim 13, wherein before receiving, on the radio resource, the at least two service data from the at least two terminals that has been subjected to the collaboration processing and is sent by the at least two terminals, the method further comprises:

obtaining at least one of information related to a packet having an association relationship with the data or information related to the association relationship, and informing a corresponding terminal.

18. A base station comprising a processor and a memory having stored thereon a computer program that when executed by the processor, performs the method of claim 13.

19. A terminal, comprising:

a transceiver;

a processor; and a memory for storing instructions, wherein the processor is configured to execute the instructions to perform, through a common function layer of at least two terminals, a collaboration processing on at least two service data from the at least two terminals, according to at least one of: an association relationship of the at least two service data from the at least two terminals, or an association relationship of the at least two services of the at least two terminals; and the transceiver is configured to transmit own service data in the at least two service data from the at least two terminals, that has been subjected to the collaboration processing, on a radio resource;

wherein the processor is further configured to number the at least two service data from the at least two terminals uniformly according to at least one of: the association relationship of the at least two service data from the at least two terminals, or the association relationship of the at least two services of the at least two terminals, to obtain a plurality of pieces of service data each piece of which has a service number; or before transmitting, on the radio resource, the own service data in the at least two service data from the at least two terminals, that has been subjected to the collaboration processing, the transceiver is further configured to send a resource request to a base station through a Buffer Status Report (BSR) or a second signalling, wherein the resource request comprises second indicative information, and the second indicative information comprises a size of data having an association relationship with to-be-sent data requested by the terminal and indicative information of a corresponding terminal.

* * * * *